3,649,684
PROCESS FOR THE PREPARATION OF METHACRYLIC ACID

Shinichi Akiyama, Kamakura-shi, and Shoichiro Minami, Yokohama-shi, Japan, assignors to The Japanese Geon Company, Ltd., Tokyo, Japan
No Drawing. Filed July 25, 1969, Ser. No. 845,074
Int. Cl. C07c 57/04
U.S. Cl. 260—530 N                              8 Claims

ABSTRACT OF THE DISCLOSURE

A process for the preparation of methacrylic acid, which comprises catalytically reacting methacrolein with molecular oxygen at elevated temperatures in vapor phase, in the presence of a catalyst consisting essentially of (a) molybdenum, (b) palladium or platinum, (c) arsenic (d) oxygen as the essential components, and any of (e) phosphorus, boron or silicon as an optional component.

---

This invention relates to a process for the preparation of methacrylic acid by the vapor phase oxidation of methacrolein.

In the preparation of methacrylic acid by oxidation of methacrolein at high temperatures, normally the effective control of the reaction is difficult, since methacrolein is an extremely unstable substance. That is, when the catalytic activity in the reaction system is extremely high, occasionally such objectionable phenomena as excessive decomposition, accumulation of carbon and tar components, polymerization, abnormal generation of heat, etc. are induced, and also the selectivity of the reaction is remarkably lowered. On the other hand, when the catalytic activity is low, conversion per single pass is reduced. These phenomena bring negative effects on the commercial application of the reaction.

Accordingly, therefore, the object of the present invention is to provide a process for the preparation of methacrylic acid with high selectivity from methacrolein at high conversion, at relatively low reaction temperatures, by the use of catalyst free from the foregoing defects.

The object of the invention is accomplished by the catalytic vapor phase reaction of methacrolein with molecular oxygen at elevated temperatures, in the presence of a catalyst system consists essentially of (a) molybdenum, (b) palladium or platinum, (c) arsenic, and (d) oxygen, as the essential components, and any of (e) phosphorus, boron, and silicon, as the optional component.

In the above catalyst system employed in the present invention, the composition ratio of named elements are optionally determined in accordance with the composition of gas in the feed, operational conditions, etc. Generally the suitable atomic ratio of molybdenum to palladium or platinum is within the range of 2–50:1, particularly 3–25:1. Again the suitable atomic ratio of arsenic to palladium or platinum is within range of 0.1–10:1, and that of phosphorus, boron or silicon to palladium platinum is within the range of 0.2–10:1.

The method of preparing the catalyst employed in this invention is not a very important factor, since the method per se does not appreciably affect this invention. For example, the catalyst can be easily prepared by calcining a mixture of starting materials prepared by the following conventional procedures of catalyst preparation, such as mixing of respective metal oxides, evaporation of a solution containing component elements to dryness, co-precipitation, etc., at temperatures ranging from 300–500° C. in air, for several to several tens of hours. The starting materials need not be in the form of metal oxides, but the metals themselves or compounds thereof can be used so long as they finally form the corresponding oxides by calcination. As such compounds of the metals, metal salts such as nitrates, carbonates, ammonium salts, chlorides, etc. and acids of the metals such as molybdic acid, phosphomolybdic acid, silicomolybdic acid, arsenic acid, arsenious acid, phosphoric acid, boric acid, silicic acid, chloroplatinic acid, etc. may be named. When silicon is selected as the optional component of the catalyst of this invention, it is preferred to use a silicon compound chemically bonded with other essential element, such as silicomolybdic acid, rather than silicic acid, as the starting material of silicon.

The preparation of catalyst of this invention will be explained referring to typical examples. In the first method, aqueous nitric acid solution (or suspension) of arsenic trioxide is added to an aqueous solution of a molybdate, such as ammonium molybdate, and the resulting mixture is evaporated to dryness under stirring. The dried product is added to aqueous ammonia containing palladium chloride (or platinum chloride) and phosphoric acid (or boric acid or silicic acid), and again evaporated to dryness under stirring. The dried product is calcined and ground to a suitable form, e.g. pellets or finely divided particles.

According to the second method, aqueous phosphomolybdic acid is added to aqueous ammonia containing palladium chloride (or platinum chloride) and arsenic acid, evaporated to dryness under stirring, calcined and ground to provide a similar catalyst.

The catalyst of this invention is a complex catalytic oxide consisting of (a), (b), (c) and (d) components as above specified, or of (a), (b), (c), (d), and (e) components. However the precise composition thereof is not yet clear. It is not fully confirmed if it is a simple mixture of several metal oxides or if the component elements are mutually linked directly, or indirectly through oxygen.

The catalyst of this invention can if desired, be deposited upon supports such as silicon carbide, colloidal silica, alumina, refractory materials or like materials. The amount of support used can be suitably selected, since it bears no essential significance on the catalyst's activity.

According to the invention, the molecular oxygen can of course be used by itself, but it may be diluted with an inert gas which does not adversely affect the reaction, such as nitrogen, argon, carbon dioxide, saturated hydrocarbon gas, etc. Preferably, air is a most practical source of molecular oxygen.

The reaction temperature can be suitably varied over a wide range practicing the subject process, depending on correlation of such factors as the composition of catalyst employed, ratio of methacrolein to oxygen, feed rate thereof, and contact time, etc. Normally it is preferred to employ the temperature range of 250°–400° C. The mol ratio of oxygen to methacrolein in the feed gas supplied to the reactor is suitably within the range of 0.2–5, but it may exceed 5:1. Suitable space velocity (SV) ranges 200–3,000 hr.$^{-1}$, as calculated from the apparent volume of the catalyst, particularly 300–2,000 hr.$^{-1}$.

In the subject process, the pressure at which the reactor is operated is not a very important factor in the process, and while higher pressures are operable, entirely satisfactory results are obtained at or near atmospheric pressure.

In practicing the subject process, no essential difference is observed due to varied grain size of the catalyst. Thus, conventional apparatuses suited for practicing vapor phase oxidation can be generally used. The catalyst bed may be of fixed which uses solid, shaped catalyst, or of so-called fluidized type.

The methacrylic acid can be recovered from the reaction product by conventional methods such as condensation, extraction with water or other suitable solvent.

Furthermore, since the oxidation of methacrolein is greatly exothermic, the control of reaction temperature is difficult. Consequently, it is difficult to maintain high selectivity in the oxidation of methacrolein. Conventionally therefore, steam is often used as a diluent, because it has a high heat capacity. Since the catalyst of the invention exhibits high activity at low temperatures and maintains high selectivity of the reaction to facilitate the reaction temperature control, steam need not be used. Thus the desired product is obtained at high concentrations. This means that the subsequent industrial refining and recovery step of methacrylic acid is very much facilitated. This is considered one of the favorable characteristics of the invention. Obviously, addition of steam is permissible, if such is desirable in consideration of the composition of gas employed in the feed, operational conditions, desired product, catalyst composition, etc.

Hereinafter the invention will be explained in more concrete manner, referring to working examples. In the examples, the conversion of methacrolein, and methacrylic acid yield and selectivity are determined by the following calculations. All the analyses were conducted by means of gas chromatography.

Conversion (percent)
$$= \frac{\text{methacrolein in the feed (mol)} - \text{methacrolein in the effluent (mol)}}{\text{methacrolein in the feed (mol)}} \times 100$$

$$\text{Yield (percent)} = \frac{\text{methacrylic acid formed (mol)}}{\text{methacrolein supply (mol)}} \times 100$$

$$\text{Selectivity (percent)} = \frac{\text{yield}}{\text{conversion}} \times 100$$

EXAMPLE 1

06 g. (0.086 mol) of ammonium molybdate $$((NH_4)_6Mo_7O_{24}\cdot 4H_2O)$$

were dissolved in 200 ml. of water by heating, and 5.0 g. (0.025 mol) of arsenic trioxide dissolved in 200 ml. of 30% nitric acid were added. The resulting mixture was evaporated to dryness under stirring. Then the resulting composition was added to 200 ml. of 10% aqueous ammonia containing 8.9 g. (0.05 mol) of palladium chloride and 5.0 g. (0.05 mol) of ortho-phosphoric acid dissolved therein, followed by evaporation to dryness under stirring. The remaining solid was calcined at 350° C. for 20 hours in air, in a muffle furnace. The composition of the catalyst obtained was, in terms of atomic ratio, Mo:Pd:P:As=12:1:1:1.

Eight (8) ml. of such catalyst was placed in a glass reactor of 14 mm. in inner diameter, and a gaseous mixture of methacrolin 5%, oxygen 13%, and nitrogen 82%, percentages being by volume, passed over the catalyst in a reactor maintained at 355° C., the space velocity (SV) being 600 hr.$^{-1}$. Methacrylic acid was obtained with the methacrolein conversion of 65.7%, methacrylic acid yield of 47.7% and selectivity of 73.2%.

EXAMPLE 2

By the method substantially similar to that of Example 1 except that the amount of arsenic trioxide was reduced to 2.6 g. (0.013 mol), a catalyst containing the following components at the following atomic ratio was prepared: Mo:Pd:P:As=12:1:1:0.5.

This catalyst was used in oxidation of methacrolein under substantially the same reaction conditions as employed in Example 1. At the reaction temperature of 350° C., the following results were obtained: methacrolein conversion of 68.4%, methacrylic acid yield of 49.5%, and selectivity of 72.4%.

EXAMPLE 3

By the method substantially similar to that of Example 1 except that the amount of palladium chloride was increased to 17.8 g. (0.1 mol), a catalyst containing the following components at the below-specified atomic ratio was prepared: Mo:Pd:P:As=12:12:1:1. This catalyst was used in the oxidation of methacrolein under substantially the same reaction conditions as employed in Example 1. At the reaction temperature of 345° C., the following results were obtained: methacrolein conversion of 70.1%, methacrylic acid yield of 50.0%, and selectivity of 71.4%.

EXAMPLE 4

A catalyst was prepared similarly to that of Example 1, except that the ortho-phosphoric acid was replaced by 3.1 g. (0.05 mol) of boric acid.

Separately, another catalyst was prepared similarly to that of Example 1, except that the ammonium molybdate was replaced by 114 g. (0.05 mol) of silicomolybdic acid ($H_2[SiO_4Mo_{12}O_{36}]\cdot 30H_2O$) and orthophosphoric acid was not used. The composition of those catalysts was as follows, in terms of atomic ratio: Mo:Pd:X:As=12:1:1:1, X being B or Si. Those catalysts were used in oxidation of methacrolein under the same reaction conditions as employed in Example 1, with the following results:

| Catalyst composition Mo-Pd-X-As | Reaction temperature (° C.) | Methacrolein conversion, percent | Methacrylic acid, percent | |
|---|---|---|---|---|
| | | | Yield | Selectivity |
| B | 347 | 67.4 | 45.3 | 67.3 |
| Si | 325 | 66.2 | 39.8 | 60.1 |

EXAMPLE 5

A Mo-Pt-P-As catalyst was prepared by a method substantially similar to that of Example 1 except that the palladium chloride was replaced by 25.9 g. (0.05 mol) of chloroplatinic acid. The atomic ratio of the elements in the catalyst was as follows: Mo:Pt:P:As≐12:1:1:1.

The catalyst was used in oxidation of methacrolein under substantially the same reaction conditions as employed in Example 1. At the reaction temperature of 371° C., the following results were obtained: methacrolein conversion of 71.2%, methacrylic acid yield of 39.4%, and selectivity of 55.4%.

EXAMPLE 6

A Mo-Pd-As catalyst was prepared in a manner substantially similar to that of Example 1 except that the amount of arsenic trioxide was increased to 6.9 g. (0.035 mol) and ortho-phosphoric acid was not used.

This catalyst was used in the oxidation of methacrolein at the reaction temperature of 348° C., under substantially the same reaction conditions as employed in Example 1, with the following results: methacrolein conversion of 63.6%, methacrylic acid yield of 36.4%, and selectivity of 57.2%.

EXAMPLE 7

Ammonium molybdate (106 g.; 0.086 mol) was dissolved in 200 ml. of water with heating, and 5.0 g. (0.025 mol) of arsenic trioxide dissolved in 200 ml. of 30% nitric acid were added, followed by evaporation to dryness. The resulting solid product and 470 g. of Alundum (⅛″ x ⅛″) were added to 200 ml. of 10% aqueous ammonia containing 8.9 g. (0.05 mol) of palladium chloride and 5.0 g. (0.05 mol) of ortho-phosphoric acid dissolved therein, followed by evaporation to dryness. The catalyst deposited on a support (Alundum) was subsequently calcined at 350° C. for 20 hours in air.

The resulting catalyst composition in terms of atomic ratio was as follows: Mo:Pd:P:As≐12:1:1:1. The amount of catalyst deposited on an Alundum was approximately 12.7%, calculated from the weight increase.

One-hundred (100) ml. (115 g.) of the catalyst were placed in a SUS 27 stainless steel reactor tube of 25 mm. in inner diameter, and through which a material gas composed of 7.4% of methacrolein and 92.6% of air by volume was passed at a space velocity (SV) of 500 hr.$^{-1}$, at the reaction temperature of 350° C., for approximately 3 hours. Thereafter the reaction was conducted each by 10 minutes at the various temperatures as specified in the table below, with the corresponding results in the same table.

| Reaction temperature (° C.) | Methacrolein conversion, percent | Methacrylic acid, percent | |
|---|---|---|---|
| | | Yield | Selectivity |
| 332 | 46.1 | 40.7 | 88.4 |
| 339 | 53.2 | 44.0 | 82.7 |
| 345 | 61.4 | 48.6 | 79.2 |
| 351 | 67.2 | 50.8 | 75.0 |
| 358 | 72.4 | 51.5 | 71.3 |
| 365 | 75.8 | 49.2 | 65.6 |

We claim:

1. A process for the preparation of methacrylic acid, which comprises catalytically reacting methacrolein with molecular oxygen at an elevated temperature in the vapor phase, in the presence of a catalyst consisting essentially of (a) molybdenum, (b) palladium or platinum, (c) arsenic, and (d) oxygen.

2. The process of claim 1, wherein said catalyst is deposited on a support.

3. A process for the preparation of methacrylic acid, which comprises catalytically reacting methacrolein with molecular oxygen at an elevated temperature in the vapor phase, in the presence of a catalyst consisting essentially of (a) molybdenum, (b) palladium or platinum, (c) arsenic, (d) oxygen, and (e) phosphorus, boron or silicon.

4. The process of claim 3, wherein said catalyst is deposited on a support.

5. A process for the preparation of methacrylic acid, which comprises catalytically reacting molecular oxygen with methacrolein at the mol ratio of oxygen to methacrolein of 0.2–5.0:1, a reaction temperature of 250°–400° C., and space velocity of 200–3,000 hr.$^{-1}$, in the vapor phase, in the presence of a catlyst consisting essentially of (a) molybdenum, (b) palladium or platinum, (c) arsenic, and (d) oxygen, the atomic ratio of (a):(b):(c) being within the range of 2–50:1:0.1–10.

6. The process of claim 5, wherein said catalyst is deposited on a support.

7. A process for the preparation of methacrylic acid, which comprises catalytically reacting methacrolein with molecular oxygen at the mol ratio of oxygen to methacrolein of 0.2–5.0:1, a reaction temperature of 250°–400° C., and space velocity of 200–3,000 hr.$^{-1}$, in the vapor phase, in the presence of a catalyst consisting essentially of (a) molybdenum, (b) palladium or platinum, (c) arsenic, (d) oxygen and (e) phosphorus, boron or silicon, the atomic ration of (a):(b):(c) being within the range of 2–50:1:0.1–10, and that of (c):(b) being within the range of 0.2–10:1.

8. The process of claim 7, wherein said catalyst is deposited on a support.

References Cited

UNITED STATES PATENTS

| 3,280,182 | 10/1966 | Gasson et al. | 260—530 N |
| 3,387,029 | 7/1968 | Hartel et al. | 260—530 N |
| 3,420,880 | 1/1969 | Clark et al. | 260—530 N |
| 3,435,069 | 3/1969 | Bethell et al. | 260—530 N |

FOREIGN PATENTS

| 904,304 | 8/1962 | Great Britain | 260—533 N |
| 1,443,698 | 1/1969 | Germany | 1—530 N |

LORRAINE A. WEINBERGER, Primary Examiner

R. D. KELLY, Assistant Examiner

U.S. Cl. X.R.

252—432, 458, 470